(12) United States Patent
Zebuhr

(10) Patent No.: US 6,319,408 B1
(45) Date of Patent: Nov. 20, 2001

(54) SYSTEM FOR PROCESSING WASTE WATER

(75) Inventor: William H. Zebuhr, Nashua, NH (US)

(73) Assignee: Ovation Products Corporation, Nashua, NH (US)

(*) Notice: Subject to any disclaimer, the term of this patent is extended or adjusted under 35 U.S.C. 154(b) by 0 days.

(21) Appl. No.: 09/502,939

(22) Filed: Feb. 11, 2000

(51) Int. Cl.$^7$ ................................................. B01D 3/00
(52) U.S. Cl. .................. 210/624; 210/774; 210/180; 210/181; 210/532.2; 159/905; 203/10; 203/DIG. 5
(58) Field of Search .................................. 210/170, 180, 210/181, 195.1, 296, 532.2, 607, 774, 624; 159/905; 203/10, DIG. 5, 11, 91

(56) References Cited

U.S. PATENT DOCUMENTS

| | | | |
|---|---|---|---|
| 2,425,813 | 8/1947 | Kuntz | 230/217 |
| 2,432,887 | * 12/1947 | Haviland. | |
| 2,703,310 | 3/1955 | Kretchmar | 202/205 |
| 2,894,879 | 7/1959 | Hickman | 202/45 |
| 2,899,366 | 8/1959 | Hickman | 202/205 |
| 2,938,630 | * 5/1960 | Novak | 210/114 |
| 3,136,707 | 6/1964 | Hickman. | |
| 3,423,293 | * 1/1969 | Holden. | |
| 3,721,346 | * 3/1973 | Lore et al. | 210/121 |
| 3,764,483 | 10/1973 | Tleimat | 202/236 |
| 3,850,801 | * 11/1974 | Pearson | 210/170 |
| 3,861,222 | 1/1975 | Braun et al. | 74/44 |
| 3,864,252 | 2/1975 | Morin et al. | 210/152 |
| 3,890,205 | 6/1975 | Schnitzer | 202/236 |
| 4,125,946 | 11/1978 | Prager | 34/80 |
| 4,129,014 | 12/1978 | Chubb | 62/333 |
| 4,235,679 | 11/1980 | Swaidan | 202/234 |
| 4,267,021 | 5/1981 | Speros et al. | 202/176 |
| 4,333,831 | * 6/1982 | Petzinger | 210/170 |
| 4,402,793 | 9/1983 | Petrek et al. | 202/174 |
| 4,413,474 | 11/1983 | Moscrip. | |
| 4,504,361 | 3/1985 | Tkac et al. | 202/172 |
| 4,585,523 | 4/1986 | Giddings | 202/236 |
| 4,586,985 | 5/1986 | Ciocca et al. | 202/174 |
| 4,671,856 | 6/1987 | Sears | 203/22 |
| 4,707,220 | 11/1987 | Feres | 159/6.1 |
| 4,731,159 | 3/1988 | Porter et al. | 159/6.1 |
| 4,812,237 | 3/1989 | Cawley et al.. | |
| 4,895,645 | * 1/1990 | Zorich, Jr. | 210/170 |
| 5,045,155 | 9/1991 | Ramsland | 202/174 |
| 5,409,576 | 4/1995 | Tleimat | 202/174 |
| 5,411,640 | 5/1995 | Ramsland | 202/174 |
| 5,628,879 | 5/1997 | Woodruff | 202/234 |
| 5,720,177 | 2/1998 | Derrick et al. | 62/115 |
| 5,810,975 | 9/1998 | Bourdel | 202/176 |
| 5,958,239 | 9/1999 | Sing. | |

FOREIGN PATENT DOCUMENTS

| | | |
|---|---|---|
| 213478 | 5/1941 | (CH). |
| 714705 | 12/1941 | (DE). |
| 803938 | 10/1936 | (FR). |
| 263053 | 12/1926 | (GB). |
| 757085 | 9/1956 | (GB). |

OTHER PUBLICATIONS

What is . . . Distillation. The Water Company. www.goodwater.com/wht–s–ds–htm., 1996.

* cited by examiner

*Primary Examiner*—David A. Simmons
*Assistant Examiner*—Frank M. Lawrence
(74) *Attorney, Agent, or Firm*—Cesari and McKenna, LLP

(57) ABSTRACT

A residence (13) discharges its waste water into a septic tank (10). A pump (18) draws waste from the tank's liquid layer and feeds it to a distiller (22) as distiller feed. The distiller (22) divides the distiller feed into distillate and distiller residue. The distiller residue is returned to the septic tank (10), whereas the distillate is reused or discharged into a leach field. In either case, the adverse environmental effects of leach-field use are largely eliminated.

54 Claims, 4 Drawing Sheets

SYSTEM FOR PROCESSING WASTE WATER

BACKGROUND OF THE INVENTION

1. Field of the Invention

The present invention is directed to waste-water treatment. It particularly concerns improvements in the use of septic tanks.

2. Background Information

Although many residents in the more-developed countries are served by common waste-water treatment facilities, individual septic systems provide that function for a large number of other residents. A residence or other waste-water source discharges its waste into a septic tank. Settling causes a relatively clear liquid layer to form between settled-out solids and buoyant materials that form a "mat" on top of the liquid layer. Water drains from the liquid layer into, say, a leach field. In the better-functioning systems, the leach field largely purifies the water before it reaches a water table from which well water is drawn.

Although septic systems have been quite effective in a large number of installations, many factors combine to make their capacities only marginal in many cases. Because of increases in population density and other siting factors, leach-field capacities have often been so low as to cause restrictions on shower and toilet use. This has resulted in large-scale efforts to reduce shower-head flow rate and per-flush water use. Few of these measures have been beneficial from the standpoint of user convenience and some have been counter-productive even as conservation measures. Moreover, even leach fields that seem to have more than adequate leaching capacity have often proved not to purify water adequately. So a great need has developed to increase septic-system improvement.

SUMMARY OF THE INVENTION

I have found that both effective septic-system capacity and resultant water quality can be greatly increased by using a distiller to recover water from the waste. In accordance with my invention, waste is drawn from the septic tank and directed to a distiller as distiller feed. In most embodiments of the invention, the bulk of the distiller residue would be returned to the septic tank, but most of the distillate would not. It would typically be reused, so it would not burden the leach field or other recipient of the septic tank's drainage. By thus enabling users to circumvent the leaching cycle, the present invention not only increases the septic system's effective capacity but also reduces required well capacity. Even if the distillate is discharged into the leach field, the system increases the resultant water quality.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
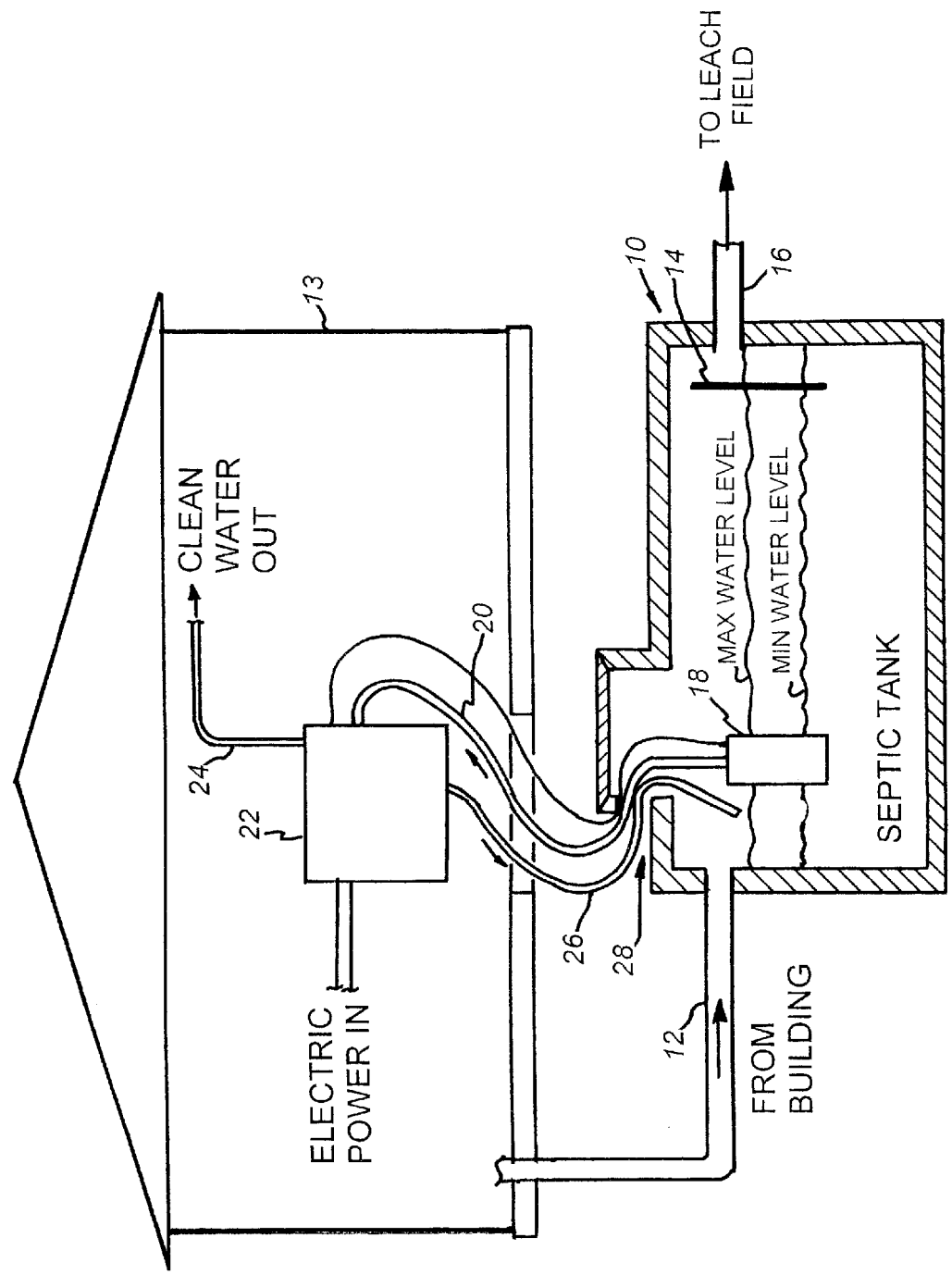
FIG. 1 is a diagrammatic representation of an embodiment of the present invention.

In FIG. 1, a septic tank 10 receives waste by way of a main waste in let 12 from a residence 13 or other waste source. In the illustrated embodiment, a screen or other barrier 14 prevents buoyant waste from passing through a main outlet 16 into a leach field or other recipient of septic-tank drainage. As will become apparent, though, the present invention will in many cases eliminate the need for such an outlet and thus for the barrier.

Solids settle to the bottom of the tank, leaving relatively clear but still contaminated water between it and "mat" of buoyant waste. In the illustrative embodiment, a pick-up mechanism 18, to be described in more detail below, draws waste from this relatively clear-water region and pumps it through a distiller-feed conduit into a distiller 22. The present invention's benefits can be obtained by employing any type of distiller of appropriate capacity, but the distiller is preferably a vapor-compression distiller such as one described in my copending U.S. patent applications Ser. No. 09/211,363 for an Improved Rotating Plate Heat Exchanger, Ser. No. 09/246,354 for a Rotating Plate Heat Exchanger, Ser. No. 09/209,948 for a Heat Exchange Mechanism Using Capillary Wipers, and Ser. No. 09/209,947 for A Reciprocating Low Pressure Ratio Compressor.

Now, FIG. 1 shows the distiller 22 as being located outside the septic tank, and I believe that it will be so located in most of this invention's embodiments. But that location is not a necessary feature of the invention, so references to drawing waste from the septic tank into the distiller are not intended to exclude arrangements in which no waste (except for the distillate) leaves the septic tanks. Indeed, those familiar with the contents of my above-mentioned patent applications will readily conceive of arrangements in which the distiller heat exchanger sump is integral with the septic tank, and a separate pick-up mechanism 18 is unnecessary.

A distiller acts to separate its input into a purified distillate and a distiller residue, in which impurities are relatively concentrated. FIG. 1 employs a distillate conduit 24 and a distiller-residue conduit 26 to represent these two outputs; of the distillation process. Only the small part of the distiller feed that becomes; distiller residue returns to the septic tank, as the distiller-residue conduit 26 in FIG. 1 indicates. The overwhelming majority of the distiller feed will ultimately end up as distillate. This distillate is typically added to the residence's water supply and, in any event, remains removed from the septic tank. If it is reused, It does not burden the leach field's leaching capacity. If it is returned to the leach field, it contributes to the quality of the leach field's output.

Actually, FIG. 1's representation of the distiller-residue conduit as returning through the same opening 28 in the septic tank 10 as that through which the distiller-feed conduit runs is somewhat conceptual. Although such an approach may in fact be employed in some embodiments, particularly retrofit ones, the distiller residue will in many installations instead flow through a path that includes the main waste inlet 12.

Also, although the illustrated embodiment returns the distiller residue to the septic tank without processing, this is not an essential feature of the invention. Some of the invention's more-sophisticated embodiments may subject the distiller residue to combustion or some other type of processing before returning some or all of the result to the septic tank.

The result in any event will be a great reduction in the overall load on the septic tank and its leach field or other drainage recipient. Indeed, it is conceivable that arrangements embodying certain of the invention's aspects may have no drainage outlet at all.

As was mentioned above, some embodiments may so arrange the distiller as to make it in some sense integral with the septic tank. But arrangements that employ a separate pick-up mechanism such as mechanism 18 will likely predominate, at least when the present invention's teachings are practiced by retrofitting to existing, conventional septic-tank installations. So we turn to the details of one way in which a separate pick-up mechanism may be realized.

Figure 2:
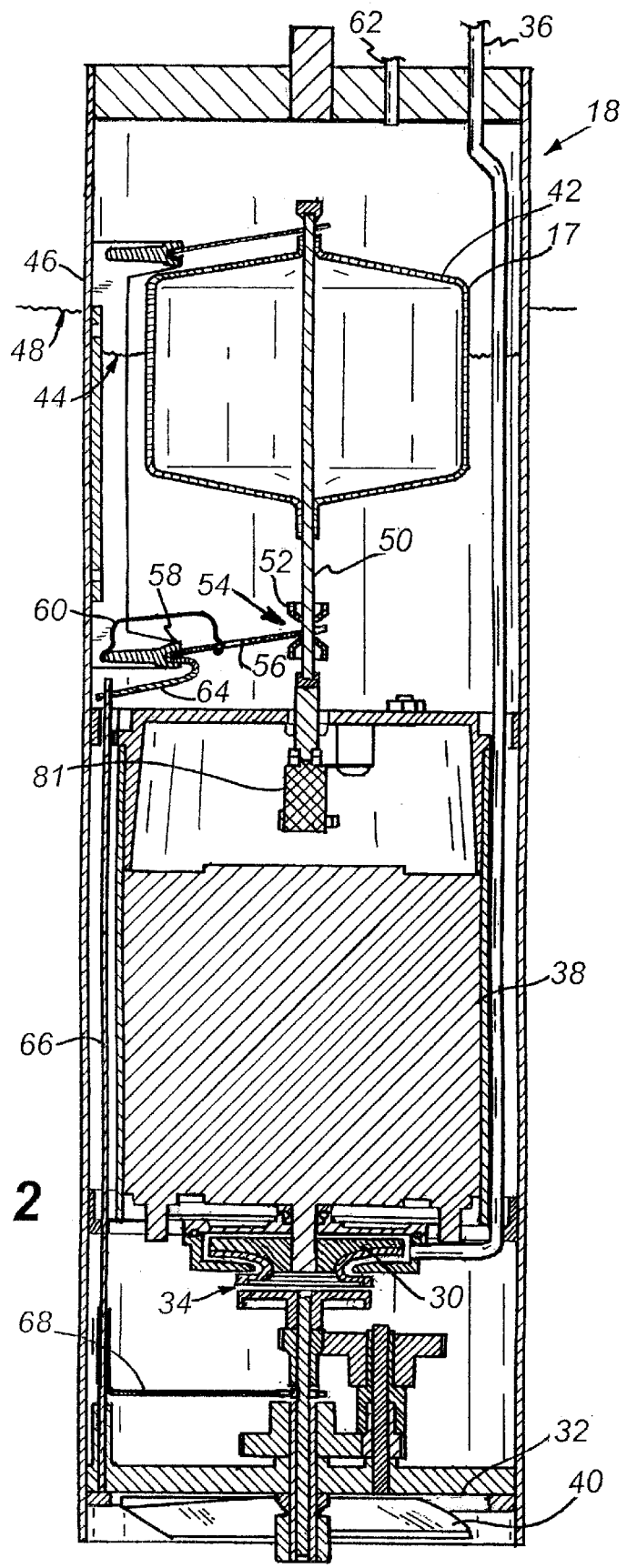
FIG. 2 is a detailed front sectional view of the water-pick-up mechanism shown in FIG. 1.

FIG. 2 shows that the pick-up mechanism 18 includes a rotor 30. It is preferable for the distiller feed to have been filtered enough to eliminate particulates of a sized greater than some maximum, so most embodiments will include a filter such as a screen 32. The rotor 30 draws waste water up through a path that includes the screen 32 and a clutch gap 34, and it pumps the thus-drawn waste water through a tube 36 that feeds FIG. 1's distiller-feed conduit 20. As will now be explained, a motor 38 intermittently drives both the rotor 30 and an impeller 40 in response to the level of a float 42.

To explain the pick-up mechanism's operation, we begin with the state in which the motor 38 is driving waste out through the pick-up outlet conduit 36. FIG. 2 depicts this state, in which the liquid level 44 inside the pick-up mechanism's housing 46 is lower than the exterior level 48 because of the pressure drop caused by resistance to flow through the screen 32.

The float 42 includes an axially extending rod 50 whose lower end forms a neck 52. The neck 52 fits in a yoke 54 formed on the end of a Z-shaped lever 56. Lever 56 is pivotably mounted in a pivot seat 58 that the housing 46's interior wall forms. An over-center spring 60 initially prevents the Z-shaped lever from pivoting downward from its illustrated stable position despite the float 42's weight.

When the rotor is pumping, it drives fluid from the pick-up mechanism's interior and thus from the tank. A vent 62 provides pressure equalization to accommodate the liquid-level changes. As the interior liquid level falls, the float 42's buoyancy point becomes low enough that the over-center spring can no longer resist snapping to its lower stable position, so the Z-shaped lever 56 snaps downward, raising its tail 64. The tail therefore pulls a clutch-operating rod 66 upward.

Figure 3:
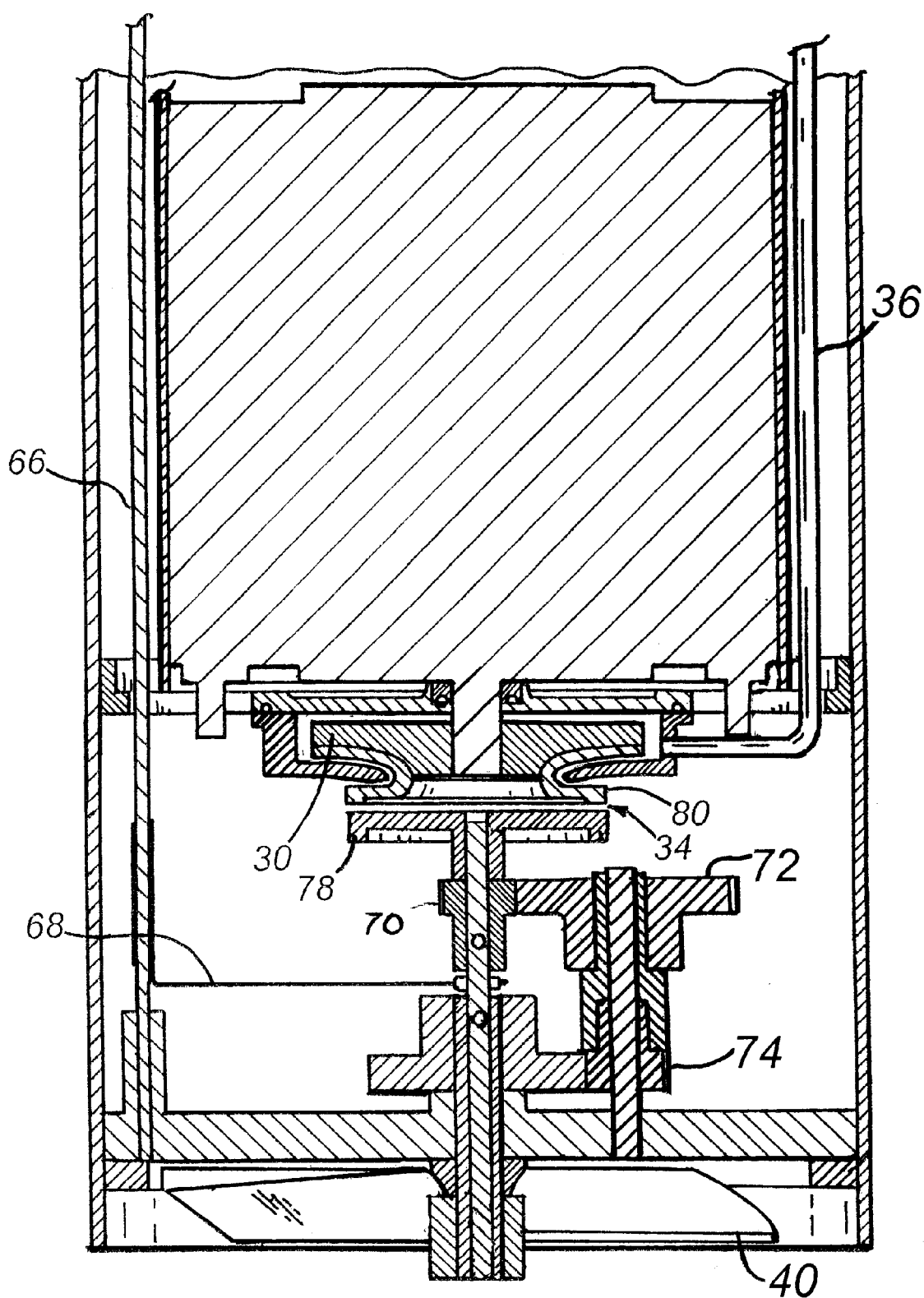
FIG. 3 is a more-detailed front sectional view of the pick-up mechanism's lower portion.
Figure 4:
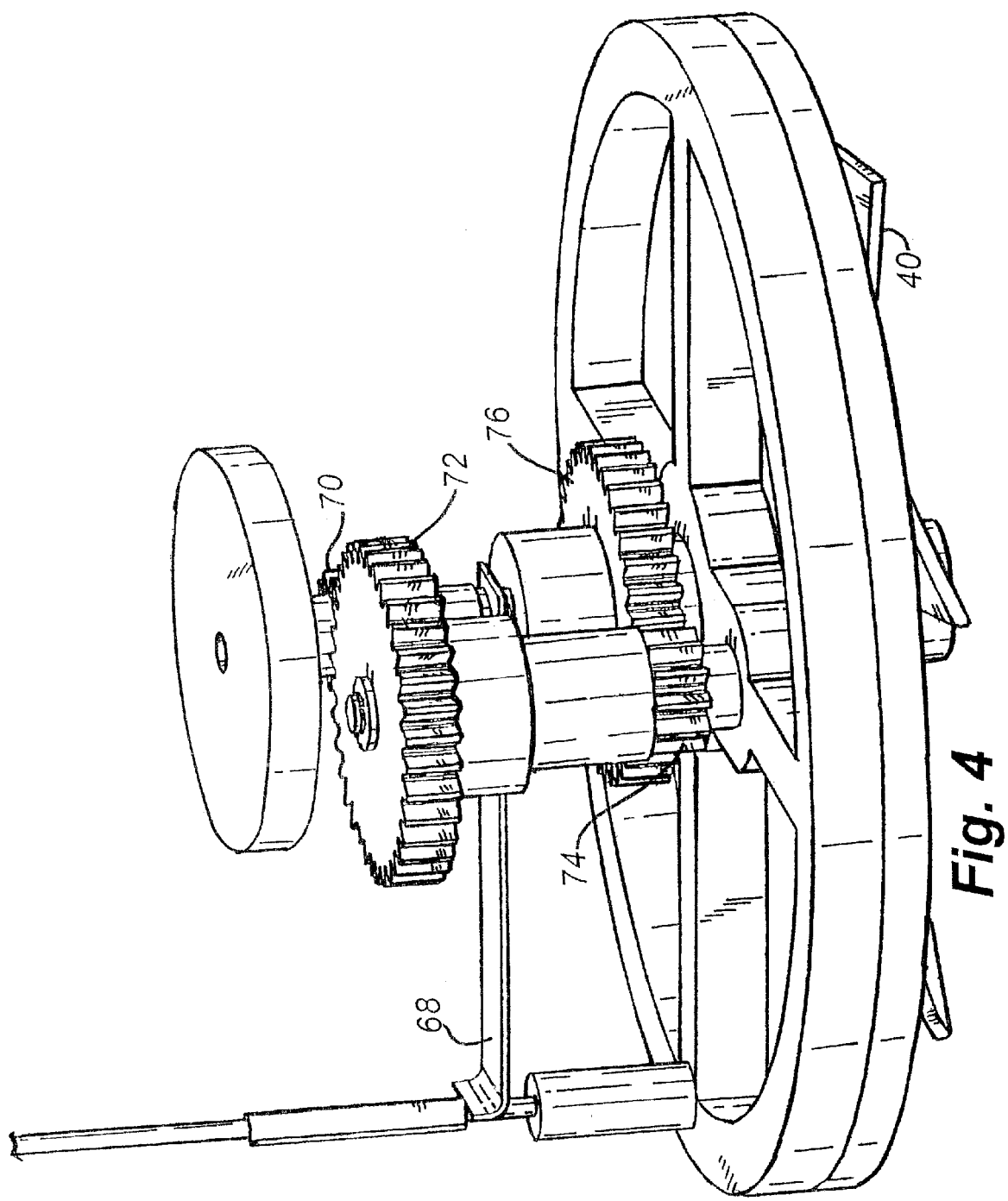
FIG. 4 is an isometric view of the rotors and their gear drive.

Up to this point, reduction gears 70, 72, 74 and 76 best seen in FIGS. 3 and 4 have remained stationary. Of these gears, a first small-diameter gear 70 meshes with a first large-diameter gear 72 provided by the same shaft as a second small-diameter gear 74. Gear 74 is in engagement with a second large-diameter gear 76 secured to the impeller 40, which therefore has also remained stationary.

When the rod 66 is raised, though, it in turn raises a bracket 68. That bracket therefore lifts a clutch plate 78 as well as gear 70, which is secured to it. This lifting does not take gear 70 out of engagement with gear 72, but it does bring clutch plate 78 into engagement with another clutch plate 80, which the motor drives. So the motor begins also to drive plate 78 and thus the gear train and through it the impeller 40.

Now, the fluid path by which the rotor had heretofore drawn waste water from the pick-up mechanism's interior for pumping through conduits 36 and 20 included the gap 34 between the clutch plates 78 and 80. With these plates now engaged, that gap has closed, so the rotor can no longer draw fluid from the pick-up mechanism's interior. Because of the centrifugal force that the rotor 30 exerts on the water above the upper clutch plate 80, though, the rotor keeps the pressure sure between the plates low and thus tends to reinforce the clutch plates' engagement.

Even though the rotor 30 is no longer drawing waste liquid from the pick-up mechanism's interior, the liquid level in the interior still falls, because the impeller 40 is now drawing fluid downward through the screen 32. The impeller size and speed are such that the resultant liquid velocity downward through the screen is considerably greater than its upward velocity when rotor 30 is pumping. This tends to flush from the screen any sludge that has accumulated there, while the impeller 40 additionally scrapes the screen bottom. In short, after a cycle in which the rotor has driven waste liquids into the distiller 22 as feed, it scrapes and flushes its screen to eliminate any sludge build-up on it.

This back-flushing should stop at some point, and the illustrated embodiment employs a timing mechanism for this purpose. When the lever snapped to its lower position in response to the lowered float buoyancy level, it also operated a delay-switch circuit 81 to a state in which, after a delay, it opens the path by which power is applied to the motor. The impeller and rotor therefore stop after the delay. That delay is long enough for the impeller essentially to empty the pickup interior. This tends to limit the buildup of buoyant materials such as oils.

When the impeller stops, the water level inside the pickup rises back to the tank level. Ordinarily, that level is still too low initially for the float to lift the lever back to the upper stable position. The delay-switch circuit 81 therefore remains open, so the motor remains off for some time.

Eventually, further waste discharge into the tank causes the float's buoyancy point to be high enough to urge the lever 56 from the lower stable position to the upper stable position. This causes the clutch plates 78 and 80 to disengage. It also so operates the delay-switch circuit 81 as to re-apply power to the motor 38, so the motor 38 again drives the rotor 30. The cycle then repeats.

It can be appreciated from the foregoing discussion that the present invention's simple use of distillation greatly reduces a residence or other building's required drainage capacity. This can result in a drastic reduction in the cost of a residence's waste-disposal system, making it practical to provide affordable housing at sites where waste-disposal-system costs would otherwise have made modest housing impractical. This is particularly true since it also reduces required well capacity. And the invention lends itself not only to implementation in new construction but also to retrofit installations. So the present invention can be implemented in a wide variety of embodiments and constitutes a significant advance in the art.

What is claimed is:

1. A method of processing waste that includes:
    A) directing waste to flow from a waste source into a septic tank;
    B) drawing waste from the septic tank into a distiller as distiller feed;
    C) employing the distiller to separate the distiller feed into distillate and distiller residue; and
    D) returning most of the distiller residue into the septic tank without returning most of the distillate thereto.

2. A method as defined in claim 1 wherein:
    A) the method further includes allowing the waste to settle so as to divide itself into a sludge layer and a predominantly liquid layer; and
    B) the waste drawn from the septic tank is drawn from the predominantly liquid layer.

3. A method as defined in claim 2 wherein the waste drawn from the septic tank into the distiller is drawn through a filter that prevents the distiller feed from including particulates greater than a predetermined maximum size.

4. A method as defined in claim 3 wherein:
A) the septic tank has a main septic-tank inlet, a main septic-tank outlet, and an auxiliary septic-tank outlet;
B) the waste directed into the main septic tank is directed thereinto through the main septic-tank inlet;
C) the waste drawn from the septic tank into the distiller is drawn through the auxiliary septic-tank outlet; and
D) the method further includes directing waste to flow out of the septic tank through the main septic-tank outlet.

5. A method as defined in claim 4 wherein the septic tank includes a barrier that prevents most floating impurities from reaching the main septic-tank outlet.

6. A method as defined in claim 1 wherein:
A) the septic tank has a main septic-tank inlet, a main septic-tank outlet, and an auxiliary septic-tank outlet;
B) the waste directed into the main septic tank is directed thereinto through the main septic-tank inlet;
C) the waste drawn from the septic tank into the distiller is drawn through the auxiliary septic-tank outlet; and
D) the method further includes directing waste to flow out of the septic tank through the main septic-tank outlet.

7. A method as defined in claim 6 wherein the waste directed through the main septic-tank outlet is directed into a leach field.

8. A method as defined in claim 1 wherein the waste drawn from the septic tank into the distiller is drawn through a filter that prevents the distiller feed from including particulates greater than a predetermined maximum size.

9. A method as defined in claim 1 wherein the septic tank is an underground septic tank.

10. A method as defined in claim 1 wherein the distiller is a vapor-compression distiller.

11. A method of processing waste that includes:
A) directing waste to flow from a waste source into the main septic-tank inlet of a septic tank having a main septic-tank inlet, a main septic-tank outlet, and an auxiliary septic-tank outlet;
B) drawing waste from the septic tank through the auxiliary septic-tank outlet into a distiller as distiller feed;
C) employing the distiller to separate the distiller feed into distillate and distiller residue; and
D) directing waste to flow out of the septic tank through the main septic-tank outlet.

12. A method as defined in claim 11 wherein the waste directed through the main septic-tank outlet is directed into a leach field.

13. A method as defined in claim 11 wherein:
A) the method further includes allowing the waste to settle so as to divide itself into a sludge layer and a predominantly liquid layer; and
B) the waste drawn from the septic tank is drawn from the predominantly liquid layer.

14. A method as defined in claim 13, wherein the septic tank includes a barrier that prevents most floating impurities from reaching the main septic-tank outlet.

15. A method as defined in claim 14, wherein the waste directed through the main septic-tank outlet is directed into a leach field.

16. A method as defined in claim 11, wherein the septic tank is an underground septic tank.

17. A method as defined in claim 11, wherein the distiller is a vapor-compression distiller.

18. A method of processing waste that includes:
A) directing waste to flow from a waste source into a septic tank;
B) drawing waste through a filter from the septic tank into a vapor-compression distiller as distiller feed, the filter preventing the distiller feed from including particulates greater than a predetermined maximum size; and
C) employing the distiller to separate the distiller feed into distillate and distiller residue.

19. A method as defined in claim 18 wherein the septic tank is an underground septic tank.

20. A waste-processing system that includes:
A) a source of domestic waste;
B) a septic tank;
C) a main inlet conduit leading from the source into the septic tank;
D) a distiller that receives waste from the septic tank as distiller feed and separates it into distillate and distiller residue;
E) a return conduit that conducts most of the distiller residue into the septic tank; and
F) a distillate conduit that conducts most of the distillate to a destination other than the septic tank.

21. A waste-processing system as defined in claim 20, further including a pump that pumps the waste from the septic tank into the distiller as distiller feed.

22. A waste-processing system as defined in claim 20, wherein the pump is positioned to draw waste from a predominantly liquid layer above a sludge layer formed when the waste settles.

23. A waste-processing system as defined in claim 22 further including a filter so positioned and constituted as to prevent the distiller feed from including particulates greater than a predetermined maximum size.

24. A waste-processing system as defined in claim 23 wherein:
A) the septic tank has a main septic-tank inlet, a main septic-tank outlet, and an auxiliary septic-tank outlet;
B) the waste directed into the main septic tank is directed thereinto through the main septic-tank inlet;
C) the waste drawn from the septic tank into the distiller is drawn through the auxiliary septic-tank outlet; and
D) the main septic-tank outlet is so disposed that waste can drain thereby from the septic tank.

25. A waste-processing system as defined in claim 24 wherein the septic tank includes a barrier that prevents most floating impurities from reaching the main septic-tank outlet.

26. A waste-processing system as defined in claim 20 wherein:
A) the septic tank has a main septic-tank inlet, a main septic-tank outlet, and an auxiliary septic-tank outlet;
B) the waste directed into the main septic tank is directed thereinto through the main septic-tank inlet;
C) the waste drawn from the septic tank into the distiller is drawn through the auxiliary septic-tank outlet; and
D) the main septic-tank outlet is so disposed that waste can flow therethrough out of the septic tank.

27. A waste-processing system as defined in claim 26 wherein the waste directed through the main septic-tank outlet is directed into a leach field.

28. A waste-processing system as defined in claim 20 further including a filter so positioned and constituted as to prevent the distiller feed from including particulates greater than a predetermined maximum size.

29. A waste-processing system as defined in claim 20 wherein the septic tank is an underground septic tank.

30. A waste-processing system as defined in claim 20 wherein the distiller is a vapor-compression distiller.

31. A waste-processing system that includes:
A) a source of domestic waste;
B) a septic tank having a main septic-tank inlet and a main septic-tank outlet through which waste can drain from the septic tank;
C) a main inlet conduit leading from the source into the septic tank through the main septic-tank inlet;
D) a vapor-compression distiller that receives waste from the septic tank as distiller feed and separates it into distillate and distiller residue; and
E) a pump that draws waste from the septic tank into the distiller as distiller feed.

32. A waste-processing system as defined in claim 31 wherein the waste directed through the main septic-tank outlet is directed into a leach field.

33. A waste-processing system as defined in claim 31 wherein:
A) the method further includes allowing the waste to settle so as to divide itself into a sludge layer and a predominantly liquid layer; and
B) the waste drawn from the septic tank is drawn from the predominantly liquid layer.

34. A waste-processing system as defined in claim 33 wherein the septic tank includes a barrier that prevents most floating impurities from reaching the main septic-tank outlet.

35. A waste-processing system as defined in claim 34 wherein the waste directed through the main septic-tank outlet is directed into a leach field.

36. A waste-processing system as defined in claim 31 wherein the septic tank is an underground septic tank.

37. A waste-processing system that includes:
A) a source of domestic waste;
B) a septic tank having a main septic-tank inlet and a main septic-tank outlet through which waste can drain from the septic tank;
C) a main inlet conduit leading from the source into the septic tank through the main septic-tank inlet;
D) a vapor-compression distiller that receives waste from the septic tank through a distiller-feed path as distiller feed and separates it into distillate and distiller residue; and
E) a filter interposed in the distiller-feed path to prevent the distiller feed from including particulates greater than a predetermined maximum size.

38. A waste-processing system as defined in claim 37 wherein the septic tank is an underground septic tank.

39. A waste-processing system as defined in claim 37 further including a pump that pumps the waste from the septic tank into the distiller as distiller feed.

40. A waste-processing system that includes:
A) a septic tank including a main septic-tank inlet, by which the tank can receive waste;
B) a distiller that receives waste from the septic tank through a distiller-feed path as distiller feed and separates it into distillate and distiller residue;
C) a return conduit that conducts most of the distiller residue into the septic tank; and
D) a distillate conduit that conducts most of the distillate to a destination other than the septic tank.

41. A waste-processing system as defined in claim 40 wherein:
A) the septic tank has a main septic-tank outlet by which waste can drain from the septic tank; and
B) the septic tank includes a barrier that prevents most floating impurities from reaching the main septic-tank outlet.

42. A waste-processing system as defined in claim 40 further including a filter interposed in the distiller-feed path to prevent the distiller feed from including particulates greater than a predetermined maximum size.

43. A waste-processing system as defined in claim 42 wherein:
A) the septic tank has a main septic-tank outlet by which waste can drain from the septic tank; and
B) the septic tank includes a barrier that prevents most floating impurities from reaching the main septic-tank outlet.

44. A waste-processing system as defined in claim 40 further including a pump that pumps the waste from the septic tank into the distiller as distiller feed.

45. A waste-processing system as defined in claim 40 wherein the distiller is a vapor-compression distiller.

46. A waste-processing system that includes:
A) a septic tank including a main septic-tank inlet, by which the septic tank can receive waste, and a main septic-tank outlet, by which waste can drain from the septic tank;
B) a vapor-compression distiller that receives waste from the septic tank through a distiller-feed path as distiller feed and separates it into distillate and distiller residue; and
C) a distillate conduit that conducts most of the distillate to a destination other than the septic tank.

47. A waste-processing system as defined in claim 46 wherein the septic tank includes a barrier that prevents most floating impurities from reaching the main septic-tank outlet.

48. A waste-processing system as defined in claim 46 further including a filter interposed in the distiller-feed path to prevent the distiller feed from including particulates greater than a predetermined maximum size.

49. A waste-processing system as defined in claim 48 wherein the septic tank includes a barrier that prevents most floating impurities from reaching the main septic-tank outlet.

50. A waste-processing system as defined in claim 46 further including a pump that pumps the waste from the septic tank into the distiller as distiller feed.

51. A waste-processing system that includes:
A) a septic tank having a main septic-tank inlet, by which the septic tank can receive waste, and a main septic-tank outlet, through which waste can drain from the septic tank;
B) a vapor-compression distiller that receives waste from the septic tank through a distiller-feed path as distiller feed and separates it into distillate and distiller residue; and
C) a filter interposed in the distiller-feed path to prevent the distiller feed from including particulates greater than a predetermined maximum size.

52. A waste-processing system as defined in claim 51 further including a pump that pumps the waste from the septic tank into the distiller as distiller feed.

53. A waste-processing system as defined in claim 51 wherein the septic tank includes a barrier that prevents most floating impurities from reaching the main septic-tank outlet.

54. A waste-processing system as defined in claim 53 further including a pump that pumps the waste from the septic tank into the distiller as distiller feed.

* * * * *

UNITED STATES PATENT AND TRADEMARK OFFICE
CERTIFICATE OF CORRECTION

PATENT NO.   : 6,319,408 B1
DATED        : November 20, 2001
INVENTOR(S)  : William H. Zebuhr It is certified that error appears in the above-identified patent and that said Letters Patent is hereby corrected as shown below:

Column 6,
Line 24, replace "claim 20" with -- claim 21 --.

Signed and Sealed this

Twenty-ninth Day of October, 2002

Attest:

Attesting Officer

JAMES E. ROGAN
*Director of the United States Patent and Trademark Office*